June 5, 1956  H. SINCLAIR  2,748,621
POWER TRANSMISSION MECHANISMS
Filed Aug. 24, 1954  3 Sheets-Sheet 1

INVENTOR
Harold Sinclair
BY
Benjamin Sweedler
ATTORNEY

June 5, 1956 H. SINCLAIR 2,748,621
POWER TRANSMISSION MECHANISMS
Filed Aug. 24, 1954 3 Sheets-Sheet 2
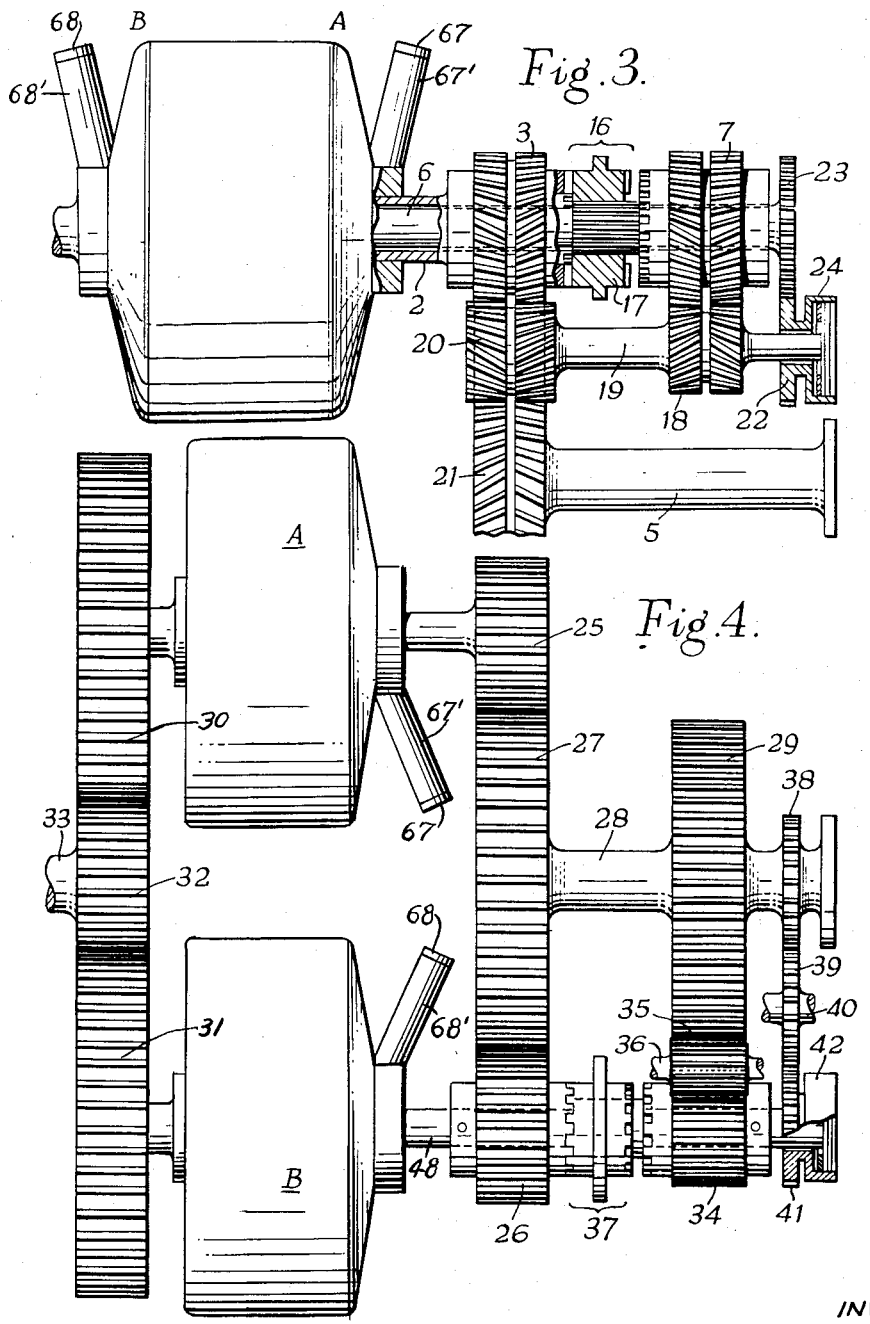
INVENTOR
Harold Sinclair
BY
Benjamin Sweedler
ATTORNEY

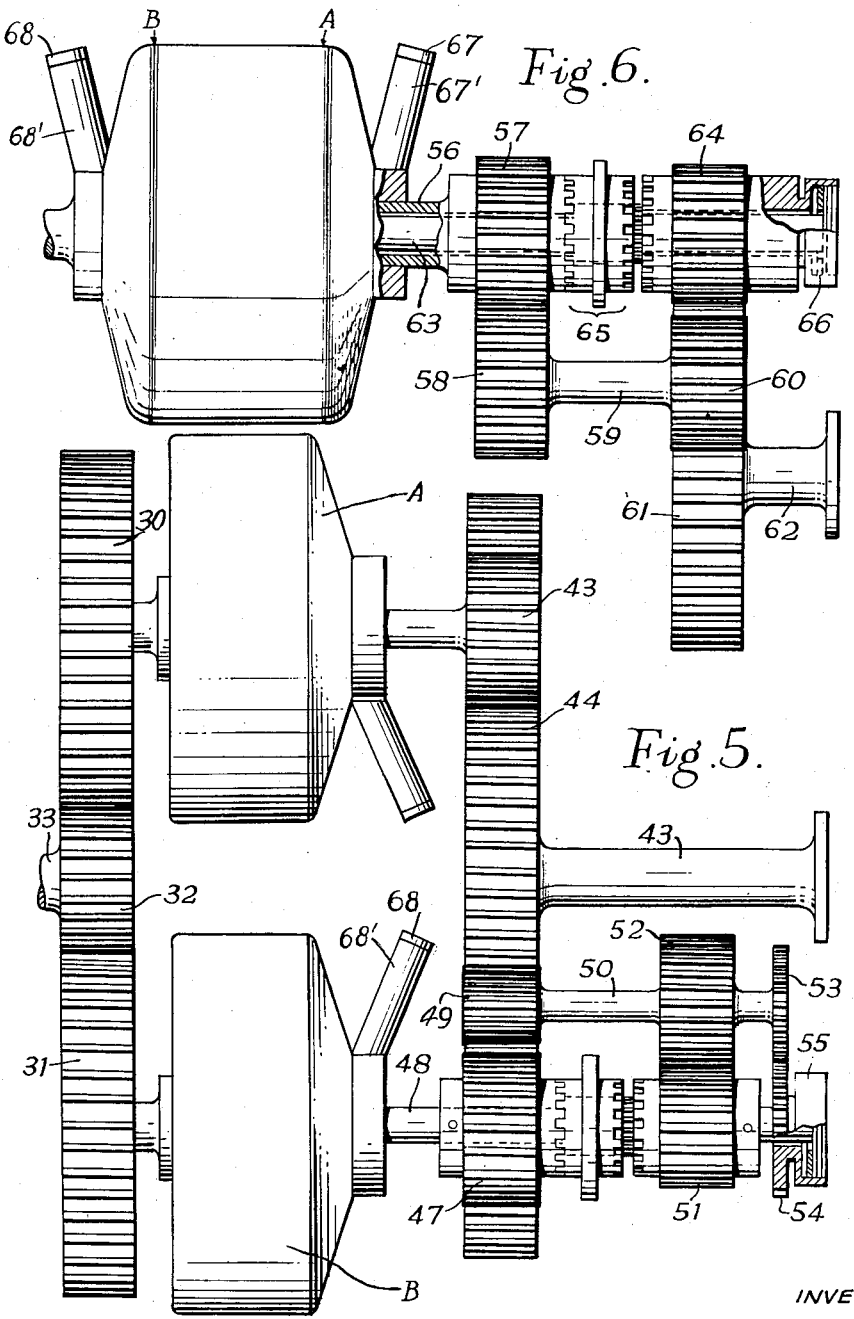

2,748,621

POWER TRANSMISSION MECHANISMS

Harold Sinclair, Windsor, England

Application August 24, 1954, Serial No. 451,861

Claims priority, application Great Britain August 31, 1953

2 Claims. (Cl. 74—720)

This invention relates to power transmission mechanisms, capable of selectively providing forward and reverse drive, of the type wherein at least two controllable slip couplings are employed of which one is drivably connected to a driven member for forward drive thereof, and the other is capable of being drivably connected to said driven member selectively via clutch means providing forward drive or clutch means providing reverse drive. An object of the invention is to provide improved means for bringing the output shaft of the last-mentioned coupling to a speed or a condition of relative angular position of the clutch elements suitable for the engagement of the clutch means for reverse drive.

A power transmission mechanism according to the invention comprises a driven member, at least one forward drive hydraulic turbo coupling or electro magnetic coupling the slip of which is controllable while the coupling is operating, said forward coupling being drivably connected to said driven member via a forward drive path, a reverse drive path, a further hydraulic turbo coupling or electromagnetic coupling, the slip of which is controllable while the clutch is operating, clutch means for selectively drivably connecting said further coupling to said driven element via a forward drive path or via said reverse drive path, said reverse drive path including a rotatable member which when said further coupling is connected to a forward drive path rotates in the opposite direction to the output shaft of said further coupling, and which rotatable member requires to be clutched to said output shaft in order to connect said further coupling to said driven member via said reverse drive path, and means whereby angular movement of said driven member in the forward direction can effect angular movement of said output shaft of said further coupling in the same direction as said rotatable member to facilitate said clutching operation.

Said clutch means for selectively engaging the reverse drive path may for example be a dog clutch, in which case the output shaft of said further coupling will require to be driven in said opposite direction substantially in synchronism with said rotatable member, to enable said clutch means to be engaged. Said clutch means are preferably however of the synchronous self-shifting type in which case the said shaft will require to be driven in said opposite direction at a speed which is fractionally higher (at least momentarily) than the speed of said rotatable member, to enable said clutch means to engage automatically.

In order that the invention may be clearly understood and readily carried into effect, some embodiments thereof will now be described with reference to the accompanying diagrammatic drawings, in which:

Figs. 1, 3 and 6 show arrangements in which two turbo couplings in axial alignment are employed.

Figs. 4 and 5 show embodiments of the invention in which two turbo couplings are employed in a side-by-side arrangement.

Figure 1:
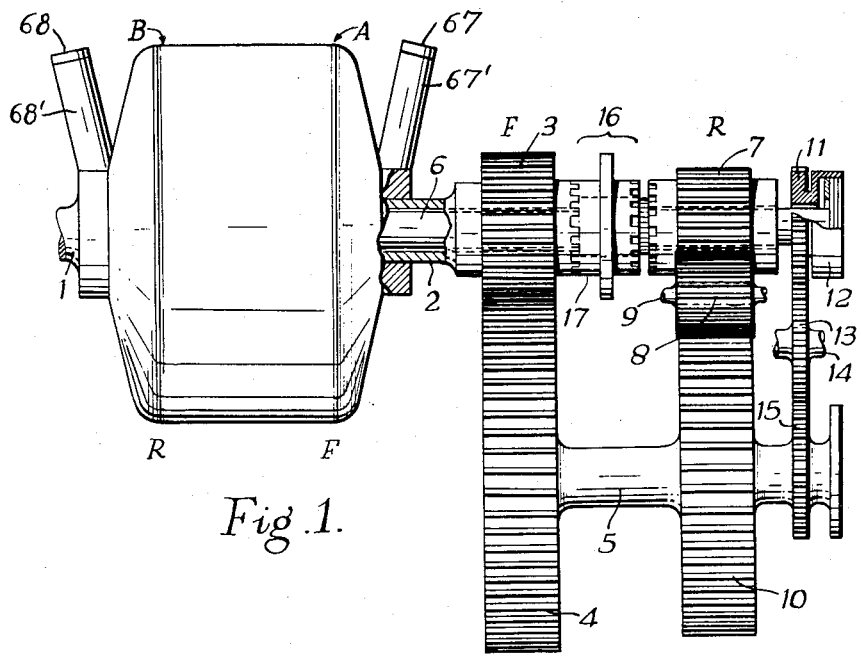
Figure 2:
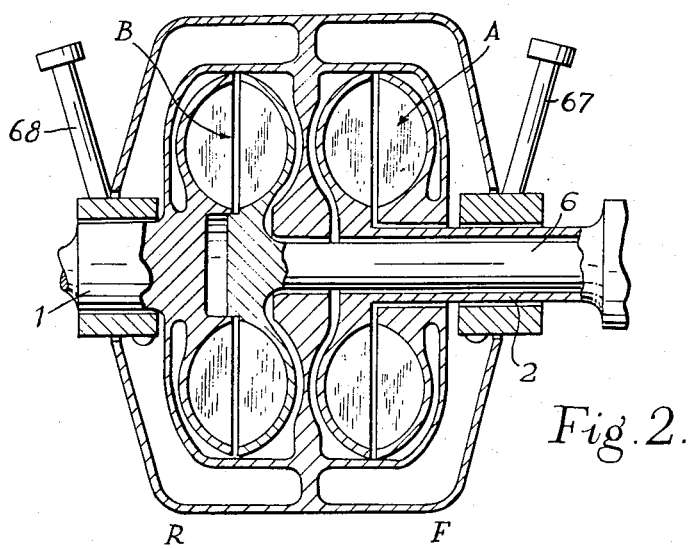
Fig. 2 shows the said two turbo couplings in more detail.

Referring to Figs. 1 and 2 of the drawing, the power transmission system illustrated comprises two hydraulic turbo couplings A and B of the type provided with an adjustable scoop tube for varying the degree of filling of the working circuit, the scoop tubes 67, 68 of the couplings A and B respectively being slidable axially in casings 67', 68' that are omitted from Fig. 2. The turbo couplings A and B are mounted in axial alignment, with their impellers drivably coupled to one another and to an input shaft 1, which is assumed to be coupled to the output shaft of a prime mover. The turbo coupling A will hereinafter be termed the "forward" turbo coupling, and the turbo coupling B will be termed the "reverse" turbo coupling. It should be noted however that as will be described the reverse turbo coupling B shares the load with the forward turbo coupling A when both couplings are engaged with the forward drive path, and it is not employed exclusively for reverse drive.

The forward turbo coupling A has an output sleeve shaft 2 which has fixed on it a forward drive pinion 3 which meshes with a forward gear wheel 4 fixed on a driven shaft 5 which constitutes the above-mentioned driven element of the transmission system. The output shaft 6 of the reverse turbo coupling B projects through and beyond the sleeve shaft 2 of the forward turbo coupling A, and the projecting portion of the shaft 6 has a reverse drive pinion 7 rotatably mounted on it, the reverse drive pinion 7 meshing with an idler gear 8 which is carried by a lay shaft 9 and which in turn meshes with a reverse gear wheel 10 fixed on the driven shaft 5. The said projecting portion of the output shaft 6 of the reverse turbo coupling B also has an auxiliary pinion 11 rotatably mounted on it and is provided with a friction clutch 12 by means of which the auxiliary pinion 11 can be clutched to and disengaged at will from the output shaft 6 of the reverse turbo coupling B. The auxiliary pinion 11 meshes with an idler gear 13 which is fixed on a lay shaft 14 and meshes with a pinion 15 fixed on the output shaft 5.

A main clutch 16 is provided for clutching the output shaft 6 of the reverse turbo coupling selectively to the forward drive pinion 3 or to the reverse drive pinion 7. The said main clutch may, as shown, comprise a double-acting dog clutch member 17 which is axially movable on the said output shaft of the reverse turbo coupling so as to be selectively engageable with jaw clutch teeth on the forward drive and reverse drive pinions.

In normal forward drive, when the forward and reverse turbo couplings A and B share the load, the output shaft 6 of the reverse turbo coupling B is clutched to the forward drive pinion 3, and both turbo couplings A and B have their working circuits filled, so that the output shafts of both turbo couplings rotate in the same direction, which may be termed the "forward" direction, and both are drivably coupled to the forward drive pinion 3. The rotation of the driven shaft 5 causes the reverse drive pinion 7 to be driven idly in the "reverse" direction, i. e. in the opposite direction to the output shaft 6 of the reverse turbo coupling, due to the provision of the idler gear 8 between the reverse drive gear wheel 10 and the reverse drive pinion 7. The friction clutch 12 is disengaged during forward running, so that the auxiliary pinion 11 is rotated by the driven shaft 5 in the same direction as the reverse drive pinion 7, due to the provision of the idler gear 14 between the auxiliary pinion 11 and the auxiliary gear wheel 15 on the driven shaft.

In order to prepare the mechanism for a change from normal forward drive to reverse drive, it is required to stop the output shaft 6 of the reverse turbo coupling B and rotate it in the "reverse" direction and to clutch it to the idly running reverse drive pinion 7. In order to achieve this, the working circuit of the reverse turbo coupling B is emptied, thereby relieving the main clutch 16 from load so that the output shaft 6 of the reverse turbo coupling B can be uncoupled from the forward drive pinion 3. The friction clutch 12 is then operated so as to clutch the auxiliary pinion 11 to the output shaft 6 of the reverse turbo coupling B, so that the said output shaft 6 is stopped and then rotated in the reverse direction, i. e. the same direction as the idly running reverse drive pinion 7, the output shaft 6 of the empty reverse turbo coupling B being then driven by the driven shaft 5 through the gear wheel 15, the idler gear 14, the auxiliary pinion 11 and the friction clutch 12. The ratio of the gearing is arranged so that when the friction clutch 12 is fully engaged the output shaft 6 of the reverse turbo coupling B rotates in the reverse direction in substantial synchronism with or slightly faster than the reverse drive pinion 7, so as to enable the output shaft 6 of the reverse turbo coupling B to be clutched by the dog clutch 16 (or S. S. S. clutch) to the reverse drive pinion 7, whereupon the friction clutch 12 is disengaged. At this stage the driven shaft 5 of the mechanism is still being driven forwardly by the forward turbo coupling A. The impeller of the empty reverse turbo coupling B is being driven in forward direction but its runner is rotating backwardly due to the reverse rotation of its output shaft 6.

In order to apply the power of the prime mover to reverse drive. e. g. for manoeuvring in the case of a ship, the working circuit of the forward turbo coupling A is emptied, so that the driven shaft 5 temporarily ceases to be driven, and the working circuit of the reverse turbo coupling B is filled. The reversely rotating runner of the reverse turbo coupling B is thereby progressively brought to rest by the application of the torque of the prime mover and is then caused to rotate in the forward direction, so that its output shaft 6 transmits driving torque to the driven shaft 5 of the mechanism through the clutch 16, the reverse drive pinion 7, the idler gear 8 and the reverse gear 10 on the driven shaft 5. In the case where the prime mover is a gas turbine, the filling of the reverse turbo coupling B may cause the turbine rotor to stop and be rotated backwards temporarily until the torque developed by the turbine overcomes the opposing torque transmitted by the forward coupling A and arising from the inertia of the driven system, e. g. a ship.

A change from reverse drive to forward drive by one turbo coupling in the converse sense can be made by emptying the reverse turbo coupling B and filling the forward turbo coupling A.

In the case where the prime mover speed when unloaded is governed, e. g. where the prime mover is a diesel engine, both turbo couplings A and B may be simultaneously emptied. On the other hand if it is preferred to keep the engine lightly loaded when the gear is in "neutral" this may conveniently be done by partly filling both turbo couplings A and B, since they are connected respectively to the forward and reverse power paths, and hence the torque in one is counterbalanced by the torque in the other. In the case where the prime mover is such that its speed when unloaded cannot conveniently be governed, e. g. a gas turbine, the forward turbo coupling A is kept at least partly full while the reverse turbo coupling B is being clutched to the reverse drive pinion 7, and the reverse turbo coupling B is then at least partly filled before emptying the forward turbo coupling A, in order to keep the prime mover under load when changing from forward to reverse drive. The reverse turbo coupling B is then completely filled and the forward turbo coupling A is emptied.

When it is required to change from forward drive by one turbo coupling to normal forward drive by both turbo couplings, e. g. after manoeuvring has ceased, the reverse turbo coupling B is empty and the main clutch 16, which is free from load, is moved to neutral in the case of the dog clutch as shown or is unlocked in the case of an S. S. S. clutch. The forward drive pinion 3 is at this time rotating in the forward direction, due to the forward turbo coupling A being filled. The reverse turbo coupling B is then filled so as to bring its output shaft 6 into near synchronism with the forward drive pinion 3, and the main clutch 16 is then enabled to clutch the output shaft 6 of the reverse turbo coupling A to the forward drive pinion 3, whereupon the load is shared between both turbo couplings A and B.

If the main clutch is a synchro-self-shifting clutch (or clutches) the ratio of the auxiliary gearing 11, 13, 15 will be arranged so that when the friction clutch 12 is engaged the output shaft 6 of the reverse turbo coupling B is driven by the driven shaft 5 at a slightly higher speed than that at which the reverse drive pinion 7 is driven by the driven shaft 5, so as to effect automatic clutching of the output shaft 6 of the reverse turbo coupling 3 to the reverse drive pinion 7, whereupon the friction clutch 12 is disengaged.

In a modification of the above-described arrangement, shown in Fig. 3, the reverse drive pinion 7 meshes with an idler gear 18 which does not mesh with a reverse gear wheel on the driven shaft 5 but is fast on a lay shaft 19 that is part of the reverse power path and on which is fixed a gear wheel 20 which meshes with the single gear wheel 21 on the driven shaft 5, and this single gear wheel 21 is also in mesh with the forward drive pinion 3. In this case the auxiliary gearing is formed by two auxiliary gear wheels 22 and 23 on the lay shaft 19 and on the output shaft 6 of the reverse turbo coupling B respectively. The auxiliary gear wheels 22 and 23 mesh with one another and either of them may be fast on its shaft, the other being normally loose on its shaft and the friction clutch being provided on the shaft on which the normally loose gear wheel is carried. In Fig. 3 the auxiliary gear wheel 22 is shown as normally loose on the lay shaft 19, and the friction clutch 24 serves to clutch it to the shaft 19 at appropriate times.

In the embodiment of the invention illustrated in Fig. 4, a forward turbo coupling A and a reverse turbo coupling B are mounted side by side with their axes parallel. The couplings A and B are provided respectively with scoop tubes 67 and 68 that are slidable axially in casings 67' and 68'. Gear wheels 25 and 26 on the output shafts of the respective turbo couplings A and B mesh with a forward gear wheel 27 on the output shaft 28, on which is also mounted a reverse gear wheel 29. The input shafts of the turbo couplings A and B carry gear wheels 30 and 31 respectively, which mesh with a pinion 32 fixed on a shaft 33 which is coupled to the output shaft of a prime mover, which may for example be a gas or steam turbine. The output shaft of the reverse turbo coupling B also carries the reverse pinion 34 which meshes with an idler gear 35 mounted on a lay shaft 36. The idler meshes with the reverse gear wheel 29 on the shaft 28. The forward and reverse pinions 26 and 34 are loose on the output shaft of coupling B and can be selectively coupled to the shaft by means of a double-acting dog clutch 37 so that the drive can be transmitted from the turbo coupling B to the shaft 28 either in forward sense via the pinion 26 and gear wheel 27, or in reverse sense via the pinion 34, idler gear 35, and reverse gear wheel 29. On the shaft 28 is fixed an auxiliary gear wheel 38 which meshes with an idler gear wheel 39 mounted on a lay shaft 40, the idler gear wheel 39 meshing with an auxiliary pinion 41 which normally is loosely mounted on the output shaft of the turbo coupling B but can be clutched to the said shaft by means of a friction clutch 42. The operation of changing from normal forward drive through both turbo couplings A and B to reverse drive through the reverse turbo coupling B alone is similar to that in the arrangement previously described, the auxiliary pinions 38 and 41 and the idler gear wheel 39 enabling the driven shaft 28 to drive the output shaft of the reverse turbo coupling B in the same direction as the reverse drive pinion 34, when the main clutch 37 has disengaged the forward drive pinion 26 from its shaft and the friction clutch 42 is engaged.

In the modification of the last-described arrangement illustrated in Fig. 5, the driven shaft 43 of the mechanism carries a single gear wheel 44, with which mesh a pinton 45 on the output shaft 46 of the forward turbo coupling A, a forward drive pinion 47 on the output shaft 48 of the reverse turbo coupling B, and a gear wheel 49 fixed on a lay shaft 50. The reverse drive pinion 51 meshes with a gear wheel 52 on the lay shaft 50, and the auxiliary gearing is formed by two auxiliary gear wheels 53 and 54 on the lay shaft and on the output shaft 48 of the reverse turbo coupling B respectively. The auxiliary gear wheels 53 and 54 mesh with one another, and either of them may be fast on its shaft, the other being normally loose on its shaft and the friction clutch being provided on the shaft which carries the normally loose gear wheel. In the arrangement illustrated the gear 54 is normally shown on shaft 48 and can be clutched to it by the friction clutch 55. As in the arrangement shown in Fig. 4, the couplings A and B are provided with scoop tubes 67 and 68 that are slidable axially in casings 67' and 68'.

In the embodiment of the invention illustrated in Fig. 6, two hydraulic turbo couplings A and B are arranged in axial alignment as in Figs. 1, 2 and 3. The output shaft of the forward turbo coupling is a sleeve shaft 56 on which is fixed a pinion 57 which meshes with a gear wheel 58 on a lay shaft 59, which has fixed on it a forward drive pinion 60 which meshes with a gear wheel 61 on the driven shaft 62 of the mechanism. The output shaft 63 of the reverse turbo coupling B projects through the sleeve shaft 56 and carries a reverse drive pinion 64 which is normally rotatable on the output shaft 63 and which meshes with the gear wheel 61 on the driven shaft 62. A main clutch 65 serves to couple the output shaft 63 of the reverse turbo coupling B selectively to the pinion 57 or to the reverse drive pinion 64 when required. In order to bring the output shaft 63 of the reverse turbo coupling B into synchronism or near synchronism with the reverse drive pinion 64, a friction clutch 66 is provided which is capable of clutching the reverse drive pinion 64 to the shaft 63 when the reverse turbo coupling B is empty, so as to enable the main clutch 64 to couple the output shaft 63 of the reverse turbo coupling to the reverse drive pinion 64.

In this case the means for driving the output shaft of the reverse turbo coupling in the reverse direction, to enable the main clutch to couple the output shaft of the reverse turbo coupling to the reverse drive pinion, is constituted by the friction clutch, the gear wheel on the driven shaft and the reverse drive pinion, an auxiliary train of gearing not being provided as in the preceding cases.

I claim:

1. A power transmission mechanism comprising a driven member, at least one first coupling the slip of which is controllable while the coupling is operating, said first coupling having its input element drivably connected to a driving member and its output element connected to said driven member via a first forward power transmission path, a further coupling having its input element drivably connected to a driving member, a second forward power transmission path, a reverse power transmission path, clutch means operable to couple the output element of said further coupling to said driven member selectively via said second forward path or said reverse path, said reverse path including a rotatable member which when said further coupling is coupled to said driven member via said forward path rotates in the opposite direction to the output element of said further coupling, and which requires to be clutched to said output shaft in order to connect said further coupling drivably to said driven member via said reverse path, characterized by means operable to enable angular movement of said driven member in the forward direction to effect angular movement of the output element of said further coupling in the same direction as said rotatable member to facilitate said clutching operation.

2. A power transmission mechanism according to claim 1 characterized in that said last-mentioned means including auxiliary gearing between said driven member and the output element of said further coupling, and auxiliary clutch means operable for selectively rendering said gearing operative or inoperative.

References Cited in the file of this patent
UNITED STATES PATENTS

| | | |
|---|---|---|
| 2,260,581 | Pollard | Oct. 28, 1941 |
| 2,301,294 | Kuhns et al. | Nov. 10, 1942 |
| 2,423,820 | Baumann | July 15, 1947 |
| 2,450,056 | Peterson et al. | Sept. 28, 1948 |
| 2,483,977 | La Brie | Oct. 4, 1949 |
| 2,499,059 | Foos | Feb. 28, 1950 |
| 2,535,904 | Davis | Dec. 26, 1950 |
| 2,557,799 | Salmivuori | June 19, 1951 |
| 2,568,275 | Dahlstrand et al. | Sept. 18, 1951 |
| 2,570,192 | Beckwith | Oct. 9, 1951 |
| 2,693,120 | Maybach | Nov. 2, 1954 |